(12) United States Patent  (10) Patent No.: US 7,844,487 B2
Chapman  (45) Date of Patent: Nov. 30, 2010

(54) COMPUTER-IMPLEMENTED METHOD FOR DISPLAYING PRICE AND VALUE EXTREMES

(76) Inventor: Gerald Chapman, 5762 Trystin Tree Dr., Medina, OH (US) 44256

( * ) Notice: Subject to any disclaimer, the term of this patent is extended or adjusted under 35 U.S.C. 154(b) by 0 days.

(21) Appl. No.: 12/341,634

(22) Filed: Dec. 22, 2008

(65) Prior Publication Data

US 2009/0192877 A1   Jul. 30, 2009

Related U.S. Application Data

(60) Provisional application No. 61/015,673, filed on Dec. 21, 2007, provisional application No. 61/015,674, filed on Dec. 21, 2007, provisional application No. 61/015,675, filed on Dec. 21, 2007.

(51) Int. Cl.
 *G06F 9/44* (2006.01)
(52) U.S. Cl. .................. 705/10; 705/36 R; 705/500
(58) Field of Classification Search ............ 705/7, 705/10
 See application file for complete search history.

(56) References Cited

U.S. PATENT DOCUMENTS

| | | | |
|---|---|---|---|
| 6,801,201 | B2 | 10/2004 | Escher |
| 6,907,404 | B1 * | 6/2005 | Li ................. 705/36 R |
| 7,043,449 | B1 | 5/2006 | Li et al. |
| 7,212,208 | B2 * | 5/2007 | Khozai ............. 345/440 |
| 7,218,325 | B1 | 5/2007 | Buck |
| 7,348,979 | B2 | 3/2008 | Tso |
| 7,356,501 | B2 * | 4/2008 | Churquina .......... 705/37 |
| 2002/0194114 | A1 | 12/2002 | Erdmier |
| 2003/0074292 | A1 | 4/2003 | Masuda |
| 2003/0139957 | A1 | 7/2003 | Satchwell |
| 2004/0128225 | A1 | 7/2004 | Thompson et al. |
| 2005/0262004 | A1 | 11/2005 | Sakata et al. |
| 2006/0265311 | A1 | 11/2006 | Dean et al. |
| 2008/0027881 | A1 | 1/2008 | Bisse |
| 2008/0086401 | A1 | 4/2008 | Mather |
| 2008/0235150 | A1 | 9/2008 | Lotan et al. |
| 2008/0243711 | A1 | 10/2008 | Aymeloglu et al. |

FOREIGN PATENT DOCUMENTS

JP   2002-183465   6/2002

(Continued)

OTHER PUBLICATIONS

Ensign Software—Charts: Candlesticks downloaded from http://web.archive.org/web/20071017184321/http://ensign.editme.com/candlesticks (1 of 5) on Jul. 8, 2009 2:12:51 PM.*

(Continued)

*Primary Examiner*—Beth V Boswell
*Assistant Examiner*—Mark A Fleischer
(74) *Attorney, Agent, or Firm*—Hahn Loeser + Parks LLP; Scott M. Oldham, Esq.

(57) ABSTRACT

A method of transforming the standard O.H.L.C. (open, high, low, close) bar chart into a new advanced chart that diagrams value changes occurring within the charted period, disclosing the sequence of occurrence of value extremes (highest price or value compared to lowest price or value) as well as the direction and momentum of value changes during the ending portion of the period.

10 Claims, 8 Drawing Sheets

FOREIGN PATENT DOCUMENTS

KR  10-2006-0125663  12/2006

OTHER PUBLICATIONS http://web.archive.org/web/*/http://ensign.editme.com/candlesticks download on Jul. 8, 2009 2:13:44 PM.*

ChartFilter Stock Analysis "Triangle Patterns" 2008 ChartFilter.com.

International Application No. PCT/US2009/069190 International Search Report/Written Opinion, Jul. 29, 2010, 9 pages.

* cited by examiner

COMPUTER-IMPLEMENTED METHOD FOR DISPLAYING PRICE AND VALUE EXTREMES

CROSS-REFERENCE TO RELATED APPLICATIONS

This patent application claims priority to three provisional patent applications having respective Ser. Nos. 61/015,673; 61/015,674; 61/015,675; all of which were filed on Dec. 21, 2007. The subject matter of provisional patent applications having Ser. Nos. 61/015,673; 61/015,674; 61/015,675; all of which were filed on Dec. 21, 2007 are hereby incorporated into this application by reference.

BACKGROUND OF THE INVENTION

Technical analysis is a technique that can be used to attempt to forecast the future direction of security prices through the study of past pricing patterns, primarily by the use of price and volume charts. The technical analysis industry is positively exploding. Search engines list tens of thousands of web sites devoted to technical analysis.

Figure 1:
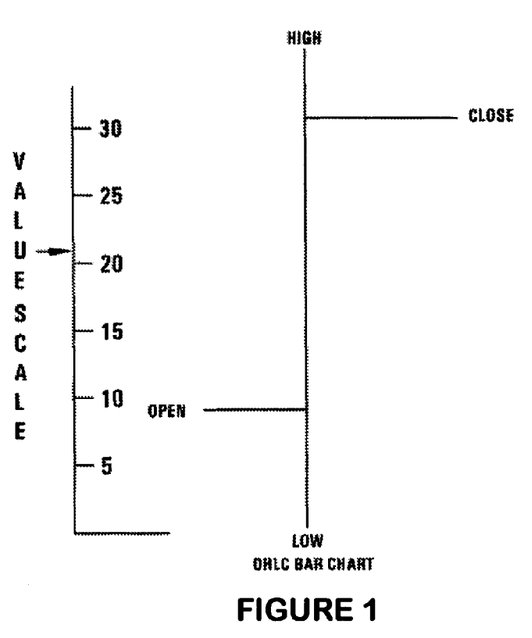
FIG. 1 illustrates an embodiment of known OHLC Bar Charting

Nonlimiting examples of methods for performing technical analysis include O.H.L.C. bar charts and candlestick charting. Regarding O.H.L.C. bar charts, the designation of the traditional bar chart is O.H.L.C, an acronym for open, high, low, close. The name itself creates an assumption of intra-period movement, which may or may not be correct since the importance of intra-period patterns are not recognized or addressed in the traditional charting methods. Each bar represents a period of time within a graph that illustrates price intervals vertically and time intervals horizontally (See FIG. 1) Time periods most commonly represented are for trading days but they can be for any period such as a week or month. Day traders even use bar charts based on individual minutes.

The bar itself consists of a vertical axis representing the range of price for the period covered. A horizontal dash projects from the left side of the vertical axis at the price level in effect at the start of the period. Another horizontal dash projects from the right side of the axis to illustrate the closing price for the period.

In addition to revealing the opening, closing, high, and low prices for the period the bar chart tells us the range of price movement and whether the price was up or down for the period. By comparing several bars in a series we can determine price trends, price volatility, and any developing price patterns. Normally a second set of verticals is located below the price graph to indicate sales volume with taller bars representing higher volume.

Figure 2:
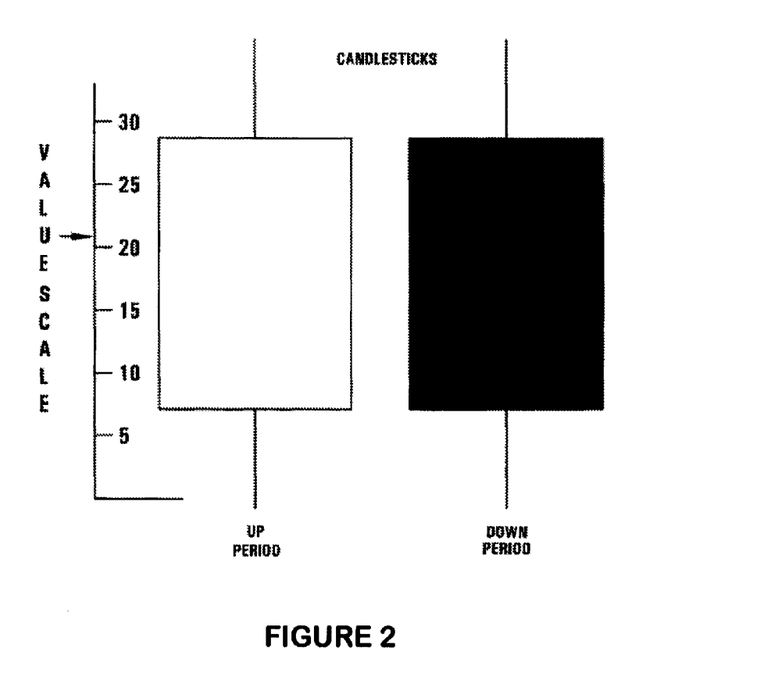
FIG. 2 illustrates an embodiment of known Candlesticks

Regarding candlestick charting, since the latter part of the nineteenth century far-eastern traders have used candlesticks for charting markets and for analysis based on trends in market psychology. Recently introduced to the western world they have steadily gained in popularity here in the last two decades. Candlestick charting provides the same information as bar charting but in a different format. The candlestick consists of a rectangular body, the height of which represents the differences between the period's opening price and the period's closing price. A centerline projecting from the top of the rectangle extends upward to the period's high. A similar centerline extends from the bottom to the period's low. The candlestick is colored to indicate whether the price increased or decreased during the period covered Down periods are usually colored black or red while up periods are usually colored white or green (See FIG. 2. An advantage to candlesticks over bar charts is the rapid recognition of direction within a period due to the color of the rectangular body or "candle". The shape of the body (depth verses width) along with the length of its top and bottom centerlines known as tails or shadows creates a unique configuration for each individual candlestick. In fact a whole area of technical analysis centers on the shapes of individual candlesticks.

BRIEF SUMMARY OF THE INVENTION

A method for using a computer to execute the electronic transformation of data into a visual depiction, the method comprising the steps of recording the values of a plurality of data points during a data period; recording the creation sequence of the data points; executing the electronic transformation of the plurality of data points into a visual depiction by using a computer; displaying the extreme values of the data points by using a first substantially straight line having two tips such that a first tip of the first substantially straight line represents the upper extreme and the second tip of the substantially straight line represents the lower extreme; displaying the first data point of the data period by using a second substantially straight line that is substantially perpendicular to the first substantially straight line; displaying the last data point of the data period by using a third substantially straight line that is substantially perpendicular to the first substantially straight line; indicating the first extreme value by using a fourth substantially straight line that connects a first tip of the second substantially straight line to the tip of the first substantially straight line that designates the first extreme value; indicating the first data point of a closing timeframe and the last data point of the closing timeframe by using a fifth substantially straight line that connects a first tip of the third substantially straight line to a point on the first substantially straight line; displaying a value scale at the same time and in combination with displaying the first substantially straight line.

A method for using a computer to execute the electronic transformation of data into a visual depiction, the method comprising the steps of recording the values of a plurality of data points that are values of at least one publicly traded instrument selected from the group consisting of stock, security, commodity, derivative, and Forex; recording the data points during a data period that is a period of time beginning on the opening of the trading period of the publicly traded instrument and ending on the closing of the trading period of the publicly traded instrument; recording the creation sequence of the data points, wherein the creation sequence of the data points is the sequence in which the values of the at least one publicly traded instrument are recorded at intervals throughout the data period; executing the electronic transformation of the plurality of data points into a visual depiction by using a computer; displaying the extreme values of the data points by using a first substantially straight line having two tips such that a first tip of the first substantially straight line represents the upper extreme and the second tip of the substantially straight line represents the lower extreme; displaying the first data point of the data period by using a second substantially straight line that is substantially perpendicular to the first substantially straight line; displaying the last data point of the data period by using a third substantially straight line that is substantially perpendicular to the first substantially straight line; indicating the first extreme value by using a fourth substantially straight line that connects a first tip of the second substantially straight line to the tip of the first substantially straight line that designates the first extreme value; indicating the first data point of a closing timeframe and the last data point of the closing timeframe by using a fifth substantially straight line that connects a first tip of the third substantially straight line to a point on the first substantially straight line; and displaying a value scale at the same time and in combination with displaying the first substantially straight line.

A method for using a computer to execute the electronic transformation of data into a visual depiction, the method comprising the steps of recording the values of a plurality of data points that are values of at least one publicly traded instrument selected from the group consisting of stock, security, fund, commodity, derivative, and Forex; recording the data points during a data period that is a period of time beginning on the opening of the trading period of the publicly traded instrument and ending on the closing of the trading period of the publicly traded instrument; recording the creation sequence of the data points, wherein the creation sequence of the data points is the sequence in which the values of the at least one publicly traded instrument are recorded at intervals throughout the data period; executing the electronic transformation of the plurality of data points into a visual depiction by using a computer; displaying the extreme values of the data points by using a first substantially straight line having two tips such that a first tip of the first substantially straight line represents the upper extreme and the second tip of the substantially straight line represents the lower extreme; displaying the first data point of the data period by using a second substantially straight line that is substantially perpendicular to the first substantially straight line; displaying the last data point of the data period by using a third substantially straight line that is substantially perpendicular to the first substantially straight line; indicating the first extreme value by using a fourth substantially straight line that connects a first tip of the second substantially straight line to the tip of the first substantially straight line that designates the first extreme value, the second tip of the second substantially straight line being a point of intersection between the second substantially straight line and the first substantially straight line, the fourth substantially straight line forming the hypotenuse of a first substantially right triangle, wherein the area of the first substantially right triangle is shaded or colored; indicating the first data point of a closing timeframe and the last data point of the closing timeframe by using a fifth substantially straight line that connects a first tip of the third substantially straight line to a point on the first substantially straight line and the second tip of the third substantially straight line is a point of intersection between the third substantially straight line and the first substantially straight line, the fifth substantially straight line forming the hypotenuse of a second substantially right triangle, wherein the area of the second substantially right triangle is shaded or colored; displaying a value scale at the same time and in combination with displaying the first substantially straight line, and the width of the first substantially straight line, the length of the second substantially straight line, the length of the third substantially straight line, or a combination thereof may vary as a function of the volume of trading of the publicly traded instrument for a particular timeframe.

Chapman Icon Charting is a computer implemented charting method that can be used to chart the price movement of financial instruments. Nonlimiting examples of such financial instruments include: securities, commodities, derivatives, and forex—all such financial instruments being collectively referred to herein as securities. Chapman Icon Charting embodiments cover a predetermined period of time and provide intra-period pricing pattern data. The data provided includes all the data shown by traditional O.H.L.C. bar charts and candlestick charts such as opening price, closing price, and range of price during the period coveted but also includes valuable additional pattern recognition such as the sequence of price extremes along with end-of-period price direction and momentum. Chapman Icon Charting in one of its embodiments can also provide instant pattern recognition by the ability to color or shade chart elements as is done in candlestick charting but with much more data being conveyed than in candlestick charting and unlike candlesticks shading or coloring is optional.

The additional intra-period pattern insight as provided by Chapman Icon Charting is especially significant since every facet of additional information can be utilized to determine its role, if any, in predicting future price movement, which is a commonly known purpose of technical analysis. Chapman Icon Charting incorporates the traditional O.H.L.C. bar chart with added display elements that are not known in conventional O.H.L.C. bar charting or even in candlestick charting, and make Chapman Icon Charting a much more advanced charting tool.

Embodiments of Chapman Icon Charting may involve uniquely important factors for intra-period pattern recognition. They include: 1) recognition of the sequence of price changes by indicating which price extreme for the data period first occurred; 2) recognition of price direction and momentum toward the end of the data period's close; 3) coloring or shading to indicate price direction; 4) dual coloring or shading; and 5) volume of activity recognition.

Overall the ideas embodied in Chapman Icon Charting will provide instant superior intra-period pattern recognition for making better predictions of future inter-period patterns. Superior pattern recognition should result in far better back testing of market trading ideas by making more visible the relationship between intra-period and the resulting inter-period movements.

Embodiments of Chapman Icon Charting offer insight into intra-period patterns of movement by showing the sequence of the major moves. No other charting method does that.

By viewing a series of Chapman Icon Charting elements intra-period tendencies can be determined such as whether the charted entity tends to fade early then bounce back or if it tends to rally early then drop. Such sequential tendencies can be analyzed for inter-period pattern and trend determination and changes in inter-period patterns or trends that might indicate a future change in course.

Chapman Icon Charting also gives insight into the actual amount, direction, and speed with which the charted subject entity gains or loses in the final moments of the period charted, also known as its closing momentum and direction. This is another feature that is not available in other charting methods even though this can prove to be essential information for Forex and day traders. Unlike time periods in daily charts, each time period used in day trading and Forex feeds into the next so that the closing direction of one period should be the opening direction of the next.

The greater insight provided into closing moments momentum could provide a much better insight into intra-period volatility. During stressful times markets tend to display greater volatility.

By viewing a series of Chapman Icon Charting elements, closing momentum tendencies may be revealed including: (A) ratio of upward to downward closings; (B) specific inter-period closing trends and patterns; and (C) any changes in inter-period patterns that might indicate a future change in course.

Because Chapman Icon Charting embodiments have one or two enclosed triangular areas which can be colored or shaded, such coloring or shading can provide a quick visual review of the number of down periods as compared to the number of up periods. Shading or coloring can also provide a quicker visual review of inter-period patterns and trends based on how the shades or colors are distributed from period to period. Shading or coloring can also provide a rapid recognition of any important changes in pattern or trend that could foretell future changes in direction.

In a Chapman Icon Charting embodiment, when only the sequential triangle on the left of the charting element is shaded or colored to indicate the period's overall direction and the closing direction/momentum triangle on the right of the charting element is shaded or colored according to the direction of movement, up or down, during the closing moments, then a quick visual realization of both the period's overall and closing movements can be created.

As is the case of the overall period's price movement, shading or coloring can also provide quick recognition of inter-period ratios, patterns, and trends as they pertain to intra-period closing moments. Here again, pattern or trend changes might foretell future direction. While shading or coloring may create a better display in pattern charting it is not mandatory as it is in candlestick charting.

Price movements made at above average volumes are generally considered more important than lower volume moves. In most financial charting vertical volume bars are shown below the price chart giving a good idea of the actual volume but not how it compares to the average. Several embodiments in Chapman Icon charting will permit the recognition of volume that is near average or above or below average by the use of a varying width vertical axis or by lengthening or shortening the horizontal lines representing the period's opening or close. Longer horizontal lines will indicate higher volume while shorter lines will represent lower volume. In fact, the opening horizontal line can be used to indicate volume range for the entire period while the closing line can be used to indicate volume status during closing. High closing volume may indicate a rush to buy or a rush to sell. This is the kind of information a trader should know but the period's closing volume is unavailable in O.H.L.C. bar charting and in candlestick charting.

A whole field of technical analysis expertise has grown around candlestick groupings. The same type of element grouping analysis can be applied using Chapman Icon Charting in place of candlesticks. Compared to candlestick charting, Chapman Icon Charting has several pattern charting elements for each candlestick and the Chapman Icon Charting elements contain more data so the number of groupings to analyze would increase and due to superior data the forecasting reliability should increase as well.

Figure 10:
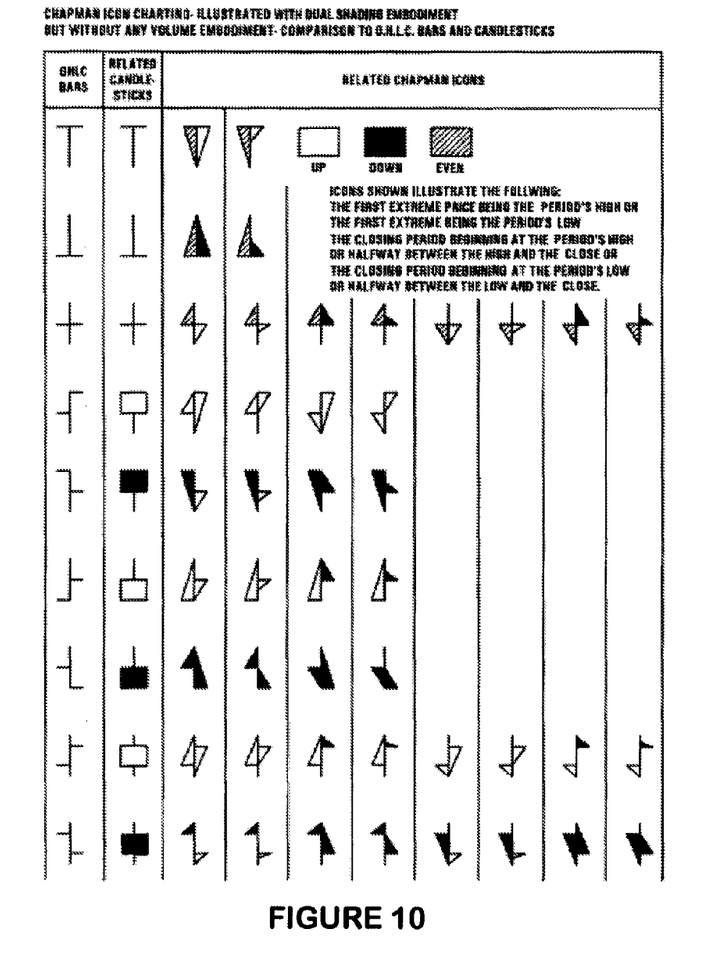
FIG. 10 illustrates embodiments of Chapman Icon Charting
Figure 11:
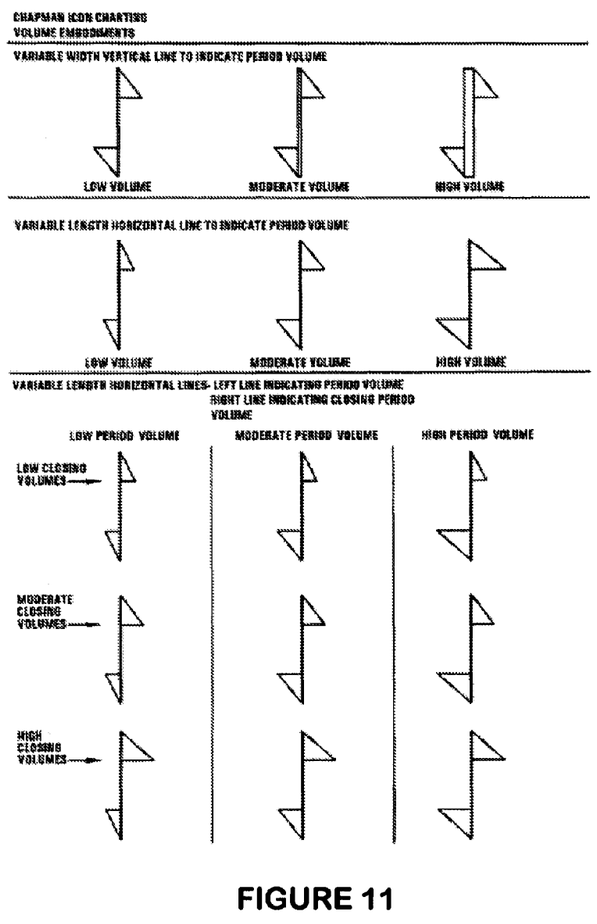
FIG. 11 illustrates embodiments of Chapman Icon Charting

Candlestick analysis is also based on individual candlestick shapes that are given names such as Doji, Dragonfly Doji, Gravestone Doji, Hanging Man, Hammer, etc. With analysis built around each shape. While there are actually only nine basic candlestick shapes there are an infinite number of different shaped Chapman Icons. There are basically three hundred and ninety six distinct icons when allowing two closing momentum possibilities—full (from the period's price extreme to the closing level) or half that amount as illustrated in FIG. 10 and nine volume configurations as illustrated in FIG. 11. It is easy to see the increased technical analysis possibilities.

The superior pattern recognition incorporated in Chapman Icon Charting will result in much easier back testing of market trading ideas. In periods where the opening value and closing value are close the direction of movement can be difficult to discern in other charting systems but not in Chapman Icon Charting because the triangles normally provide space for shading or coloring that will easily indicate the direction of movement.

DETAILED DESCRIPTION OF THE INVENTION

Generally disclosed are embodiments directed to pattern-charting methods used in Icon Charting. At least one embodiment is directed to using a computer to execute the electronic transformation of data into a visual depiction of a pattern created by the data. Another embodiment is directed to at least one pattern-charting method that can be used to display patterns created by a publicly traded instrument or security during the course of trading throughout a particular day of trading.

Pattern charting embodiments provide for using i) five lines that may be substantially straight in combination with ii) a value scale, and iii) optional shading or coloring, in older to display opening and closing prices, upper and lower market extremes, an indication of the first market extreme, the direction of data or price movement during a predefined closing timeframe, and volume of activity.

Market extremes are the greatest and least values of data points during a particular time period. An embodiment provides for the upper and lower market extremes to respectively be the greatest and lowest prices or values of a security during a trading period.

The upper market extreme can be understood as the greatest value of a plurality of data points during a particular time period or data period. An embodiment provides for the upper market extreme to be the greatest price or value of a security during a trading period.

Figure 7:
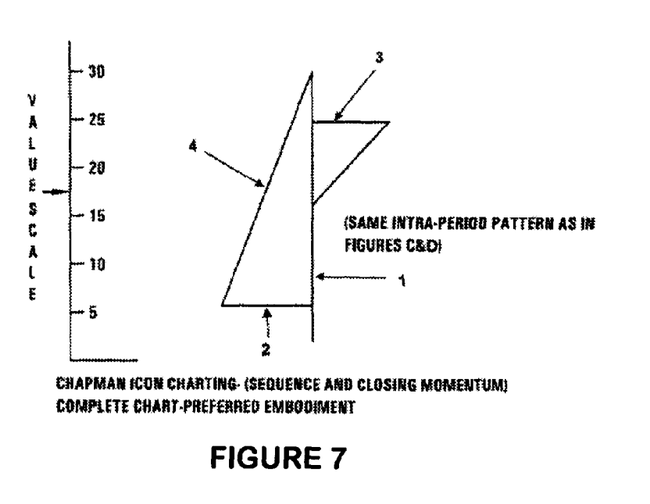
FIG. 7 illustrates an embodiment of Chapman Icon Charting

With reference to FIG. 7, and as a nonlimiting example, the upper tip of vertical line 1 represents the upper market extreme for a particular time period. The value of the upper market extreme can be determined based upon the position of the upper tip of vertical line 1 relative to the value scale shown on the left side of FIG. 7. With reference to FIG. 7, the upper market extreme is approximately 32.

The lower market extreme can be understood as the lowest value of a plurality of data points during a particular time period or data period. An embodiment provides for the lower market extreme to be the lowest price or value of a security during a trading period.

With reference to FIG. 7, and as a nonlimiting example, the lower tip of vertical line 1 represents the lower market extreme for a particular time period. The value of the lower market extreme can be determined based upon the position of the lower tip of vertical line 1 relative to the value scale shown on the left side of FIG. 7. With reference to FIG. 7, the lower market extreme is approximately 3.

The length of vertical line 1 will vary depending on the differential between the upper and lower extreme, and persons of ordinary skill in the art will appreciate this. With reference to FIG. 7, the length of vertical line 1 is approximately 29 (units) relative to the value scale shown on the left side of FIG. 7.

The first market extreme is the first extreme to occur during a particular time period or data period, and the second market extreme is the second extreme to occur during a particular time period or data period.

In those embodiments directed to security trading, an additional embodiment is directed to vertical line 1 having variable width, as opposed to length, in order to visually indicate the volume of trading for a trading period. In such an embodiment, vertical line 1 will become substantially square or rectangular as a function of the width. An embodiment provides for relatively narrow widths indicating relatively low amounts of trading, and relatively broader widths indicating relatively greater amounts of trading. Embodiments provide for displaying and positioning a scale in combination with vertical line 1 such that a person of ordinary skill in the art can generally assess the volume of trading indicated by the width of vertical line 1. Embodiments provide for three fixed or quantum widths; the first width indicating a first volume of trading, the second width indicating a second greater volume of trading, and the third width indicating a third greatest volume of trading.

An opening price or opening data point can be understood as the first price or first data point of the time period that is being measured. As a nonlimiting example, in the field of securities trading, the opening price or opening data point is the actual price of the security just prior to and at the very opening of trading for a particular period.

With reference to FIG. 7, and as a nonlimiting example, horizontal line 2 represents the opening price or opening data point for a particular time period. The value of the opening price or opening data point can be determined based upon the position of horizontal line 2 relative to the value scale shown on the left side of FIG. 7. With reference to FIG. 7, the opening price is approximately 7 or 8.

In those embodiments directed to security trading, an additional embodiment is directed to horizontal line 2 having variable length, in order to visually indicate the volume of trading for a trading period. An embodiment provides for relatively shorter lengths indicating relatively low amounts of trading, and relatively longer lengths indicating relatively greater amounts of trading. Embodiments provide for displaying and positioning a scale in combination with horizontal line 2 such that a person of ordinary skill in the art can generally assess the volume of trading indicated by the length of horizontal line 2. Embodiments provide for three fixed or quantum lengths; the first length indicating a first volume of trading, the second length indicating a second greater volume of trading, and the third length indicating a third greatest volume of trading.

A closing price or closing data point can be understood as the last price or last data point of the time period that is being measured. As a nonlimiting example, in the field of securities trading, the closing price or closing data point is the actual price of the security at the end of trading for a particular day or particular period.

With reference to FIG. 7, and as a nonlimiting example, horizontal line 3 represents the closing price or closing data point for a particular time period. The value of the closing price or closing data point can be determined based upon the position of horizontal line 3 relative to the value scale shown on the left side of FIG. 7. With reference to FIG. 7, the closing price is approximately 27 or 28.

In those embodiments directed to security trading, an additional embodiment is directed to horizontal line 3 having variable length, in order to visually indicate the volume of trading for a trading period. An embodiment provides for relatively shorter lengths indicating relatively low amounts of trading, and relatively longer lengths indicating relatively greater amounts of trading. Embodiments provide for displaying and positioning a scale in combination with horizontal line 3 such that a person of ordinary skill in the art can generally assess the volume of trading indicated by the length of horizontal line 3. Embodiments provide for three fixed or quantum lengths; the first length indicating a first volume of trading, the second length indicating a second greater volume of trading, and the third length indicating a third greatest volume of trading.

In other embodiments, the respective lengths of horizontal line 2 and horizontal line 3 may be directed to describing the volume of trading for distinct time frames or trading periods. In other words, the width of horizontal line 2 may be directed to describing the volume of trading for a first time frame or time period, and the width of horizontal line 3 may be directed to describing the volume of trading for a second time frame or time period.

A data period can be understood as a time period during which data is collected. A nonlimiting example of a data period is the trading period of a security.

A closing timeframe can be understood as a defined period of time within the data period. A closing timeframe begins at a particular time within the data period, and ends with and at the same time as the data period. A closing timeframe is an intra-data-period timeframe.

Embodiments provide for the closing timeframe to be towards the end of the data period. The closing timeframe of the data period may be measured in any known time increment including seconds, minutes, hours, days, weeks, months, or years. Nonlimiting examples of a closing timeframe can be the last half hour of the data period, the last hour of the data period, the last two hours of the data period, the last three hours of the data period, the last four hours of the data period, the last five hours of the data period, the last six hours of the data period, or the last seven hours of the data period.

In additional embodiments, a closing timeframe can be the last 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% of the data period.

Persons of ordinary skill in the art will be able to select and define a closing timeframe without having to exercise undue experimentation.

Figure 3:
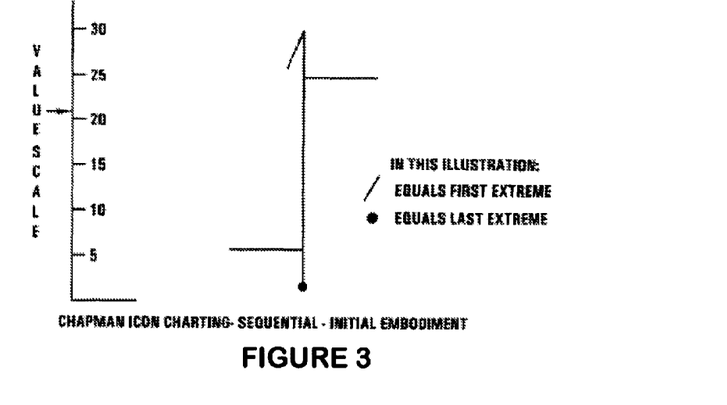
FIG. 3 illustrates an embodiment of Chapman Icon Charting

With reference to FIG. 3, embodiments of Chapman Icon Charting place a visual indicator at the top or bottom of the vertical line or price bar in order to designate the sequence, i.e. first, last, or both first and last, of extremes for the data period. If desired, both extremes can marked with different visual indicators. As illustrated in FIG. 3, a dot or ball on one of the tips of the vertical line can be used to visually indicate the second or last extreme value for the data period. FIG. 3 also illustrates that a diagonal line in contact with a tip of the vertical line can be used to indicate the first extreme of the data period. This identification of extreme price sequencing will tell the analyst or trader at a glance whether the first price extreme was the high or the low for the period. With this information the analyst or trader can ascertain whether the intra-period pattern was one of rising after opening, then dropping or if was one of dropping after opening only to rise again prior to close. In embodiments, a series of such pattern charting elements having such encoded sequential data will illustrate to the technical analyst whether a security tends to fade early only to bounce back or if it tends to rally early only to fade towards the close of each period. Such information is of obvious value when attempting to assess future price movements.

Figure 4:
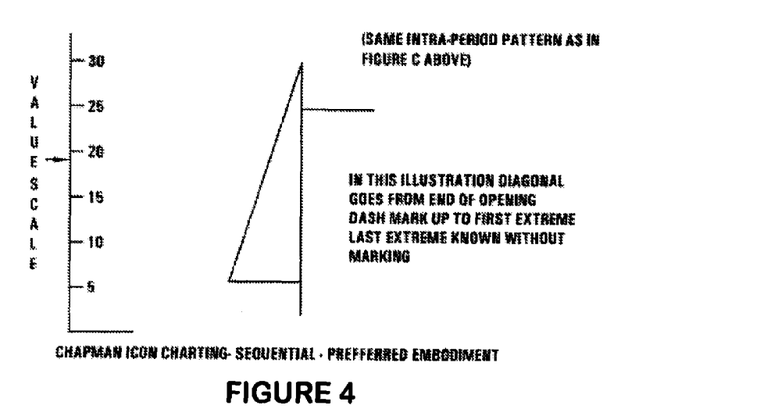
FIG. 4 illustrates an embodiment of Chapman Icon Charting

As illustrated in FIG. 4, an embodiment for indicating the first price extreme uses a diagonal-line indicator that extends from a tip of the opening-price horizontal line (i.e., the tip of the horizontal line that does not intersect with the vertical line) to the tip of the vertical line that represents the first price extreme. In FIG. 7, the first price extreme is illustrated using line 4.

Figure 5:
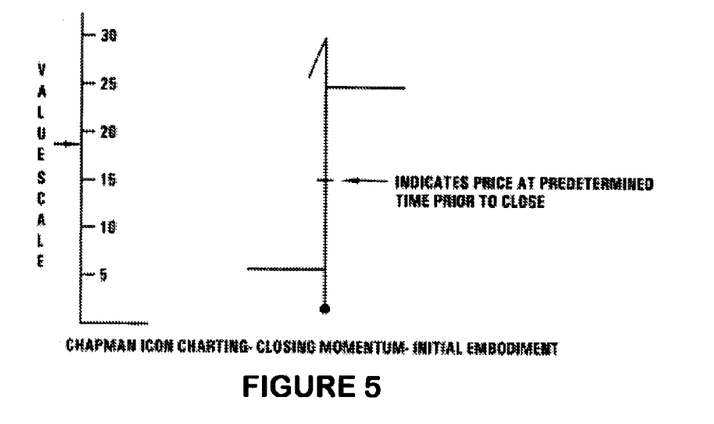
FIG. 5 illustrates an embodiment of Chapman Icon Charting

Embodiments are directed to displaying value or price direction and momentum during the period's closing moments. This can be accomplished by placing a unique marking on the vertical axis of the price bar at the price occurring at a predetermined point in time prior to closing—such as the last hour or half hour of the trading day if a trading day is the period in question, the last 10%, or a final percentage of the period covered; FIG. 5 illustrates such a marking. Traditional bar charts as well as candlesticks tell where the price has gone during the period but fail to tell how it was moving at period's end. Knowledge of the ending price momentum and particularly direction is invaluable especially in such areas as Forex or day trading where one period feeds directly into the next. For these traders, this aspect alone gives them an edge in determining market direction that was totally unavailable to them before. Other traders and analysts can review a series of periods containing closing directional momentum data and derive a sense of ratios, trends, patterns, and pattern changes, which may help foretell the future course of prices.

Figure 6:
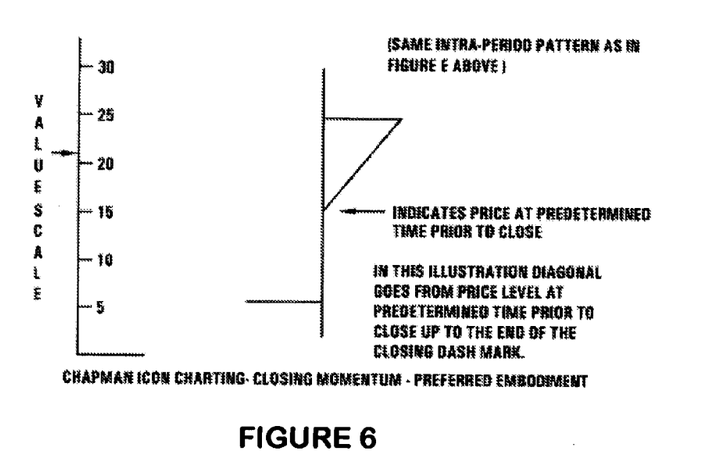
FIG. 6 illustrates an embodiment of Chapman Icon Charting

As illustrated in FIG. 6, an embodiment for displaying the pricing momentum during a closing timeframe involves identifying the appropriate point on the vertical axis that indicates the value of a security or data point at the beginning of the closing timeframe and then extending a diagonal line from that point on the vertical axis to a tip of the closing-price horizontal-line indicator. In an embodiment, and as can be seen in FIG. 6, a result of using a diagonal line to display the pricing momentum during a closing timeframe is that a substantially enclosed right triangle is formed.

With further regard to FIG. 6, the relatively upward or downward slope of the diagonal line provides a readily visible indication of both the direction and extent or momentum of the period's final price movement.

Embodiments provide that for any of the line markings used with the Chapman Icon Charting method, any of the lines may be solid, dashed, dotted, of various color, and of various shading. Embodiments also provide for Chapman Icon Charting using a substantially curved line or lines in place of a substantially straight line or lines.

Figure 8:
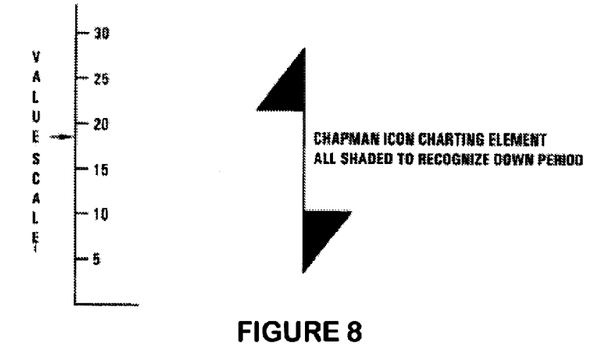
FIG. 8 illustrates an embodiment of Chapman Icon Charting
Figure 9:
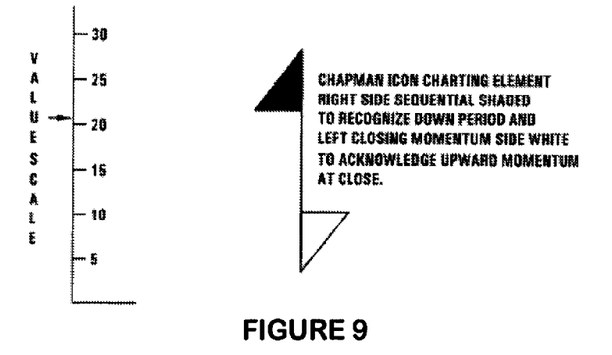
FIG. 9 illustrates an embodiment of Chapman Icon Charting

Embodiments provide for using coloring or shading to indicate price direction. The diagonals utilized in some of the embodiments create triangular enclosures that can be colored or shaded to give instant visual recognition to the intra-period's overall price-direction movement. When viewing a series of data periods, this will highlight the ratio of upward to downward closings and any related inter-period patterns as they develop. Unlike candlesticks however coloring or shading is not required to distinguish the opening from the closing or to show the direction of the period's move. Also unlike candlesticks where when opening price and closing are the same there is no body formed, pattern charts may still have areas, e.g., triangular, to color or shade. In fact, a third color or shade can be utilized to indicate even periods where opening and closing are the same or nearly so. Nonlimiting examples of coloring embodiments include green for up, red for down, and gray or white for even. Additional shading embodiments include white for up, black for down, and gray for even. Embodiments allow for any combination of colors to be used. FIGS. 8 and 9 provide nonlimiting examples of useful shading embodiments. FIG. 8 is directed to an embodiment with shaded triangular areas in order to indicate an overall down period.

Referring to FIG. 9, another shading embodiment uses dual coloring or shading. In this embodiment the left sequential triangle is colored or shaded in accordance with the overall period price direction but the right triangle which designates the price direction during the closing timeframe is colored or shaded in accordance with that price direction. In this way both the total and final price directions will be obvious at a glance.

Referring to FIG. 7, still another shading embodiment uses non-shaded triangular areas to indicate both an overall upward period as well as an upward momentum price direction during the closing timeframe.

FIG. 10 illustrates nonlimiting examples of pattern chatting embodiments in relative comparison to candlestick charting and OHLC bar charting.

Embodiments of the subject pattern-charting method are useful in the field of technical analysis of financial markets. Embodiments are also useful in other fields where this form of price or value pattern recognition may apply, and persons of ordinary skill in the art can identify such fields without having to exercise undue experimentation. As a non-limiting example, embodiments of the subject pattern-charting method are useful in fields that include medicine in order to determine concentrations of a compound or substance in a blood stream over a period of time.

Embodiments provide for using a computer to execute the electronic transformation of the data points or security prices into a visual depiction of the Chapman Icon Charting embodiments.

The above inventive embodiments are for illustrative purposes, and any of the above embodiments may be used in combination with one or more of the other embodiments.

What is claimed is:

1. A method of transforming a standard O.H.L.C. (open, high, low, close) bar chart into a chart that diagrams price or value changes occurring within a charted period, disclosing the sequence of occurrence of price or value extremes (highest price or value compared to lowest price or value) as well as the direction and momentum of price or value changes during an ending portion of the period, the method comprising using non-transitory computer-readable media having computer-readable instructions thereon executing, by a computer the following steps:

developing a time control data that identify pre-defined time periods including period openings, period closings, and intra-period closing time frame initiations,     receiving source of market price or value data for a charted entity, interfacing the time control data with the source of market price or value data, converting the time control data and the market price or value data into charting durations thereby establishing the charting period as well as an opening price or value, a closing price or value, and the charting period's intermediary price or value data including an intra-period closing time frame's initial price or value, comparing of the charting period's price or value data to establish a final highest price or value occurring during the charted period, a final lowest price or value occurring during the charted period and a range of prices or values during the charted period, determining a time sequence of extreme prices or values during a charting period, highest verses lowest, transforming of the opening price or value, closing price or value and the charting period's intermediary price or value data into a chart that defines the opening price or value, highest price or value, lowest price or value, initial closing time frame price or value and closing price or value, as well as the sequence of price or value extremes, highest verses lowest, that will provide an indication of an intra-period pricing or value pattern, and will also indicate the initial closing time frame price or value so that comparison of the price or value at the beginning of the intra-period closing time frame to the charting period's closing price or value provides an indication of a direction of change in price or value during the intra-period closing time frame, if any, as well as the degree and speed of change occurring, presenting a charting period's activity comprising a graph having a vertical price or value scale and composed of a vertical axis having a length, where the length and positioning in relation to the vertical price or value scale demonstrates the charting period's price or value range and a horizontal line extending leftwardly from the vertical axis demonstrating the charting period's opening price or value by its level of positioning in relation to the price or value scale and a horizontal line extending rightwardly from the vertical axis demonstrating the charting period's closing price or value by its level of positioning in relation to the price or value scale, the chart also graphically illustrating the sequence of the occurrence of the price or value extremes, highest or lowest, by displaying an identifying mark on or near the top of the chart's vertical axis if the period's highest price or value occurs first or by displaying an identifying mark on or near the bottom of the chart's vertical axis if the period's lowest price or value occurs first or by displaying uniquely different identifying marks, a first unique mark identifying the first occurring extreme price or value, high or low, and placed on or near the corresponding end, top or bottom, of the vertical axis and a second unique mark identifying a charting period's last extreme price or value placed on or near the opposite end of the vertical axis, and transforming the market price or value data to graphically illustrate an identification of the initial price or value of the pre-selected intra-period closing time frame by displaying an identifying mark on or near the chart's vertical axis at a level in relation to the price or value scale that correspond to the initial price or value of the intra-period closing time frame.

2. The method of claim 1, whereby a graphic display of the sequence of occurrence of price or value extremes is provided by marking only the period's first occurring extreme price or value, with the other extreme price or value then being the period's last occurring extreme price or value and having the identifying mark for the first occurring extreme price or value be a diagonal line extending from the outside tip of the horizontal line that depicts the opening price or value and indicating a general intra-period price or value movement by extending to the top of the chart's vertical axis if the first extreme price or value is the period's highest price or value or by extending to the bottom of the chart's vertical axis if the first extreme is the period's lowest price or value thus creating a left side triangular pattern except where the opening price or value is the first extreme price or value.

3. The method of claim 1, whereby a graphic display of the initial price or value of the intra-period closing time frame along with the price or value movement within the closing time frame is provided by;

marking the vertical axis of the chart at a price or value level occurring at the beginning of the closing time frame with a diagonal line that indicates intra-period closing time frame price or value movement by extending upward to the outside tip of the horizontal line representing the period's closing price or value if the level of price or value is increasing during the closing time frame or by extending downward to the outside tip of the horizontal line representing the period's closing price or value if the level of price or value is decreasing during the closing time frame, thus illustrating a direction, degree, and speed of changes in price or value during the pre-selected intra-period closing time frame as well as creating a right side triangular pattern except where there is no net change in price or value during the closing time.

4. The method of claim 2, wherein the interior of the triangular pattern is shaded or colored for indicating a direction of changes in price or value for the charted period, up or down, as determined by comparison of the opening price or value data to the closing price or value data and by selecting and generating specific shades or colors to indicate a direction of price or value movement, if any, with predetermined shades or colors representing upward price or value movement, predetermined shades or colors representing downward price or value movement and predetermined shades or colors representing no overall change in price or value.

5. The method of claim 3, wherein the interior of the triangular pattern is shaded or colored for indicating a direction of changes in price or value for the charted period, up or down, as determined by comparison of the opening price or value data to the closing price or value data and by selecting and generating specific shades or colors to indicate a direction of price or value movement, if any, with predetermined shades or colors representing upward price or value movement, predetermined shades or colors representing downward price or value movement and predetermined shades or colors representing no overall change in price or value.

6. The method of claim 3, wherein the interior of the triangular pattern is shaded or colored for indicating a direction of changes in price or value up or down, during that chart period representing the closing time frame determined by comparison of the initial price or value data of the pre-selected closing time frame to the closing price or value data and by selecting and generating predetermined shades or colors to indicate direction of any such change with a predetermined shade or color representing upward price or value movement and another predetermined shade or color representing downward price or value movement.

7. The method of claim 1, further comprising indicating volume of activity along with a pattern of price or value changes in the chart by performing the following steps;

defining a number and scope of volume ranges to be depicted for the charted entity, receiving a secondary set of input data comprising market trading volume data simultaneously with the price or value data and interfaced with the same set of time control data, transforming the volume data input interfaced with the time control data to calculate average volume for the charting period and categorize it by range based on defined volume ranges, depicting the period's volume range by an increase or decrease of a length of the chart's left horizontal line, right horizontal line, or both, in increments representing specific volume ranges.

8. The method of claim 1, further comprising indicating an average volume range during the period's closing time frame compared to the period's overall average volume range thereby providing further information regarding closing momentum by indicating whether volume levels are increasing, decreasing, or staying steady as the charting period is coming to a close by performing the following steps;

defining a number and scope of average volume ranges to be depicted for the charted entity, receiving a secondary set of input data comprising market trading volume data simultaneously with the price or value data and interfaced with the same set of time data, transforming the volume data interfaced with the time control data to calculate average volume for the entire charted period and categorize it by range of volume based on defined volume ranges that are to be depicted and also calculate average volume for the closing time frame and categorize it in a manner based upon the same volume ranges, depicting the closing time frame's volume range as compared to the entire period's volume range by an increase or decrease in length of the right horizontal closing price or value line in increments to reflect the closing time frame's average volume range as well as to increase or decrease in length of the left horizontal opening price or value line to reflect the entire period's average volume range.

9. The method of claim 1, further comprising indicating whether average volume is increasing, decreasing, or staying steady as the charting period closes by performing the following steps;

defining a number and scope of average volume ranges to be depicted for the charted entity, receiving a secondary set of input data comprising market trading volume data simultaneously with the price or value data and interfaced with the same set of time data, transforming the volume data interfaced with the time control data to calculate average volume for the entire charted period and categorize it by range of volume based on defined volume ranges and also calculate average volume for the closing time frame and categorize it in a same manner based upon the same volume ranges, depicting the closing time frame's volume range as compared to the entire period's volume range by providing a left horizontal opening price or value line of a predetermined length and with a right horizontal closing price or value line of an equal length only when the closing time frame average volume is within the same defined average volume range as the overall period's defined average volume range but increasing a length of the right horizontal closing price or value line by one increment for each additional average volume range that the closing time frame exceeds that of the overall period and decreasing the length of the horizontal closing price or value line by one increment for each closing time frame's lower volume range.

10. The method of claim 1, wherein entities other than traded securities have a series of varying values and that can be segregated into time period are used to generate a chart.

* * * * *